United States Patent [19]

Kimata et al.

[11] 4,200,120
[45] Apr. 29, 1980

[54] AREA TYPE FLOW RATE MEASURING DEVICE

[75] Inventors: Kei Kimata, Aichi; Tsugito Nakazeki, Iwata, both of Japan

[73] Assignee: NTN Toyo Bearing Company Limited, Osaka, Japan

[21] Appl. No.: 895,378

[22] Filed: Apr. 11, 1978

[51] Int. Cl.$^2$ .................... F16K 31/00; F02M 69/00
[52] U.S. Cl. .................... 137/613; 137/487; 123/139 AW
[58] Field of Search ........... 137/502, 486, 487, 613; 123/139 AW

[56] References Cited

U.S. PATENT DOCUMENTS

| | | | |
|---|---|---|---|
| 1,681,762 | 8/1928 | Connet | 137/487 |
| 1,981,576 | 10/1934 | Woolfenden | 137/502 |
| 2,627,703 | 2/1953 | Spencer | 137/502 |
| 2,829,664 | 4/1958 | Mountford | 137/502 |
| 3,739,762 | 6/1973 | Jackson | 123/139 AW |
| 4,058,100 | 10/1977 | Tanaka et al. | 123/139 AW |
| 4,085,723 | 4/1978 | Tanaka et al. | 123/139 AW |

OTHER PUBLICATIONS

Streeter, Victor L., Fluid Mechanics, McGraw-Hill Book Co., 1971, pp. 424, 471, 464–467.

*Primary Examiner*—Martin P. Schwadron
*Assistant Examiner*—A. Michael Chambers
*Attorney, Agent, or Firm*—Armstrong, Nikaido, Marmelstein & Kubovcik

[57] ABSTRACT

An area type flow rate measuring device comprising an upstream valve and a downstream valve which are disposed in a channel for a fluid, a feedback control mechanism for keeping the pressure difference across the upstream valve constant, the rate of flow of the fluid being measured on the basis of the area of opening of the upstream valve, a pipeline which bypasses the upstream valve, and a mechanism disposed in the bypass pipeline for amplifying the pressure difference by utilizing the flow of the fluid, the arrangement being such that the pressure produced in the mechanism is utilized to drive a valve opening mechanism.

6 Claims, 12 Drawing Figures

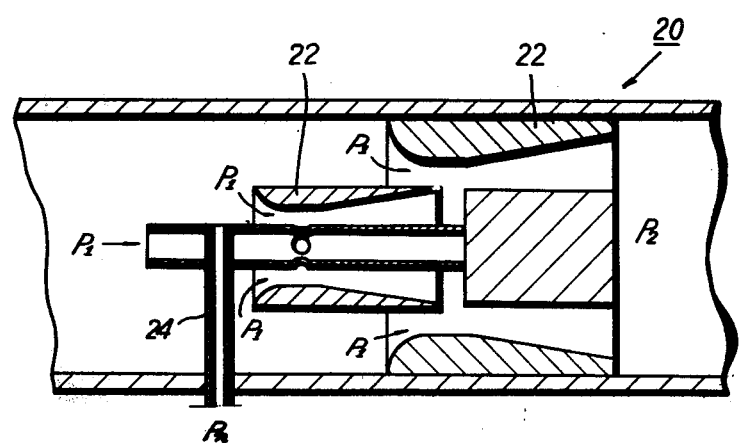

AREA TYPE FLOW RATE MEASURING DEVICE

BACKGROUND OF THE INVENTION (a) Field of the Invention

The present invention relates to a device for measuring and controlling the rate of flow of a fluid.

(b) Description of the Prior Art

Generally, there are various types of devices for measuring and controlling the rate of flow of a fluid and they have been in wide use. For example, what is shown in FIG. 1 is an example of a feedback control type air flow rate measuring device, which is used with a fuel supplying device for an internal combustion engine.

In FIG. 1, the numeral 1 designates an air suction pipe for an engine, and 2 designates a feedback control mechanism comprising a valve opening mechanism and a pressure difference control servo-mechanism 4. Disposed in said air suction pipe 1 are two air throttle valves, an upstream valve 5 and a downstream valve 6, one of which, e.g., the upstream valve 5, is used as a flow rate detecting valve and connected to the valve opening mechanism 3, and the other, the downstream valve 6, is used as a flow rate control valve and connected to an accelerator pedal 7. Let P1 be the air pressure upstream of the upstream valve 5 and P2 be the air pressure in an intermediate chamber 8 defined between the upstream valve 5 and the downstream valve 6. If the pressure difference (P1-P2) is kept constant at all times, the rate of flow of air will be proportional to the area of opening of the upstream valve 5, so that it becomes possible to measure the flow rate on the basis of the area of opening of the valve. This is the so-called area type flow rate measuring system, the pressure difference (P1-P2) being controlled so as to be constant by the subsequent feedback control mechanism 2. More particularly, if the pressure difference (P1-P2) is slightly deviated from a certain value, said servo-mechanism 4 detects and amplifies this deviation, while the valve opening mechanism 3 is actuated by the output from the servo-mechanism 4 to control the upstream valve 5 to increase or decrease the degree of opening of said upstream valve by an amount corresponding to the deviation, thereby correcting the pressure difference (P1-P2) to the constant value. The valve opening mechanism 3 comprises a diaphragm 9 installed in a body through the intermediary of a spring 10, the movable portion of said diaphragm 9 being connected to the upstream valve 5. The servo-mechanism 4 comprises chambers A and B separated by a pressure difference setting diaphragm 11, and chambers C and D separated by a variable orifice 13 whose area of opening varies with the displacement of a valve 12 interlocked to the diaphragm 11. The chambers A and D communicate with each other through a communication port 14 and are under the same pressure, the chamber B communicates with the intermediate chamber 8 downstream of the upstream valve 5, and the chamber C communicates with the valve opening mechanism 3 and with the intermediate chamber 8 through a choke 15. Further, the chambers A and D communicate with the upstream side of the upstream valve 5, so that the pressures in these chambers are P1. The pressure in the chamber B is P2. Thus, the deviation of the pressure difference (P1-P2) is detected as the displacement of the diaphragm 11 separating the chambers A and B from each other. The pressure difference (P1-P2) is set by pressure difference setting springs 17 and 18. The forces of the springs 17 and 18 are set so that they are balanced by the forces which are produced on the opposite surfaces of the diaphragm 11 by the pressures P1 and P2. The numeral 19 designates an adjusting screw for fine adjustment of the springs, and 16 designates a bellows installed in parallel with the springs 17 and 18. The bellows 16 contains a gas which is the same in pressure and temperature as the atmosphere under preselected reference conditions, i.e. at the reference pressure and temperature, and one end thereof is in contact with the valve 12 so as not to be separated therefrom and the other end is fixed to the fixed portion of the body.

The gas to be contained in the bellows will now be described in more detail. In the case where a weight flow rate type flow rate measuring device according to the present invention is applied to the internal combustion engine of an automobile, certain conditions of the atmosphere, i.e., the conditions of being 1 atmosphere and 20° are set as the reference conditions, by giving consideration to the various conditions of the atmosphere related to the place, such as level land or mountainous area, where the automobile is used, and to the season and climate, especially to the conditions of the atmosphere which are most frequently used in practice and the conditions of the atmosphere in urban areas which are most important from the standpoint of countermeasures against exhaust gas. In the case of this example, therefore, the gas at reference pressure and reference temperature to be contained in the bellows is a gas at 1 atmosphere and 20°. If air is used as the gas to be contained, air in a room at 20° may be simply contained in the bellows. The gas to be contained is not limited to air and may be other gas than air. In addition, in the case where a turbocharger is installed upstream of the pressure control valve, the reference pressure, in the above example, will be set to above 1 atmosphere. In addition, if the area of opening of the upstream valve 5 is made to be proportional to the volume rate of flow at the atmospheric pressure and atmospheric temperature during operation, the bellows 16 is unnecessary.

The operating principle of the conventional air weight measuring device for internal combustion engines of the above arrangement will be described.

If the pressure difference (P1-P2) across the upstream valve 5 is slightly deviated from a predetermined value, the diaphragm 11 is displaced to move the valve 12, so that the area of opening of the variable orifice 13 between the chambers C and D varies and the pressure Pn in the chamber C varies between P1 and P2. When the pressure Pn in the chamber C varies as a result of the deviation of the pressure difference (P1-P2) as described above, the diaphragm 9 of the valve opening mechanism 3 communicating therewith is displaced and, ultimately, the upstream valve 5 is moved in such a direction as to correct the deviation. In this case, if there are variations in the temperature and pressure of the incoming air, the volume of the gas contained in the bellows 16 varies, so that the force acting on the diaphragm 11 from the bellows 16 through the valve 12 also varies. This variation takes place in such a direction that when the specific gravity of the incoming air is increased, the pressure difference (P1-P2) is decreased, so that, ultimately, the area of opening of the upstream valve 5 is proportional to the weight flow rate. If the fuel control mechanism is connected so that the fuel flow rate may be proportional to the area of opening, then it follows that the weight ratio of suction air to fuel can be kept constant irrespective of the pressure and temperature of the atmosphere.

As described above, the device shown in FIG. 1 is used to keep constant the ratio of air to fuel. However, when it is impossible to make the pressure difference across the flow rate detecting valve 5 sufficently large, the negative pressure source Pn for driving the valve opening mechanism 3 is insufficient so that reliable operation of the flow rate detecting valve 5 is difficult.

SUMMARY OF THE INVENTION

The present invention relates to an area type flow rate measuring device comprising an upstream valve (flow rate detecting valve) and a downstream valve which are disposed in a channel for a fluid, a feedback control mechanism using a fluid for keeping the pressure difference across said upstream valve constant, the rate of flow of the fluid in said channel being measured on the basis of the area of opening of the upstream valve, said device being characterized by further comprising a pipeline which bypasses said upstream valve, and a mechanism disposed in said pipeline for amplifying the pressure difference by utilizing the flow of the fluid, the arrangement being such that the pressure produced in said mechanism is utilized to drive a valve opening mechanism.

FEATURES OF THE INVENTION

The present invention provides an area type flow rate measuring device comprising an upstream valve (flow rate detecting valve) and a downstream valve which are disposed in a channel for a fluid, a feedback control mechanism using a fluid for keeping the pressure difference across said upstream valve constant, the rate of flow of the fluid in said channel being measured on the basis of the area of opening of the upstream valve, said device being characterized by further comprising a pipeline which bypasses said upstream valve, and a mechanism disposed in said pipeline for amplifying the pressure difference by utilizing the flow of the fluid, the arrangement being such that the pressure produced in said mechanism is utilized to drive a valve opening mechanism. Because of this characteristic feature of the invention, it is possible to achieve stabilized operation of the valve opening mechanism even when the pressure difference across the flow rate detecting valve is relatively small. Thus, the performance of this type of measuring devices is improved.

BRIEF DESCRIPTION OF THE DRAWINGS

FIG. 12 is a longitudinal section of a pressure amplifying mechanism, showing a sixth embodiment of the invention.

DESCRIPTION OF THE PREFERRED EMBODIMENTS

Figure 1:
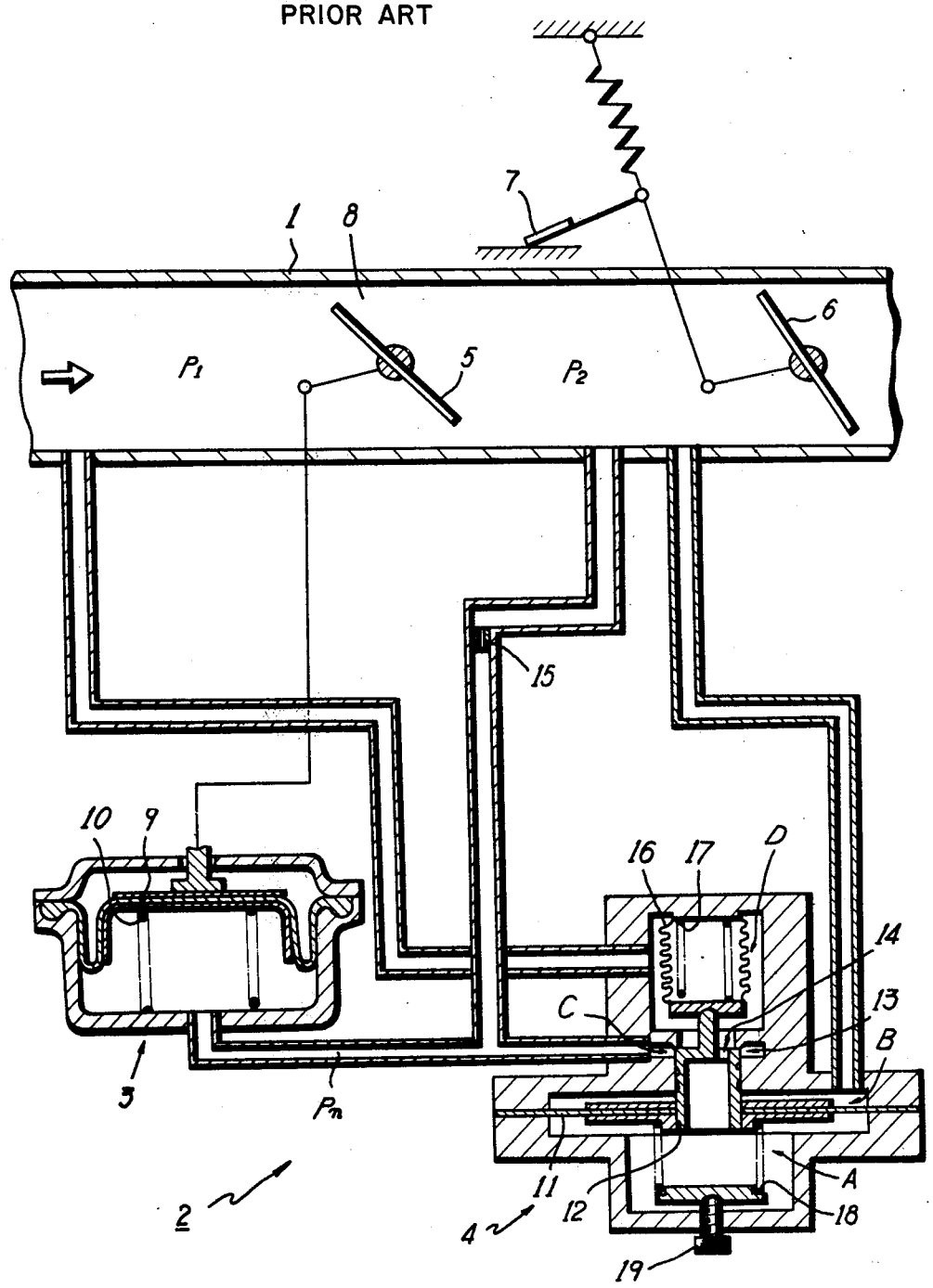
FIG. 1 is a longitudinal section of a conventional device.
Figure 2:
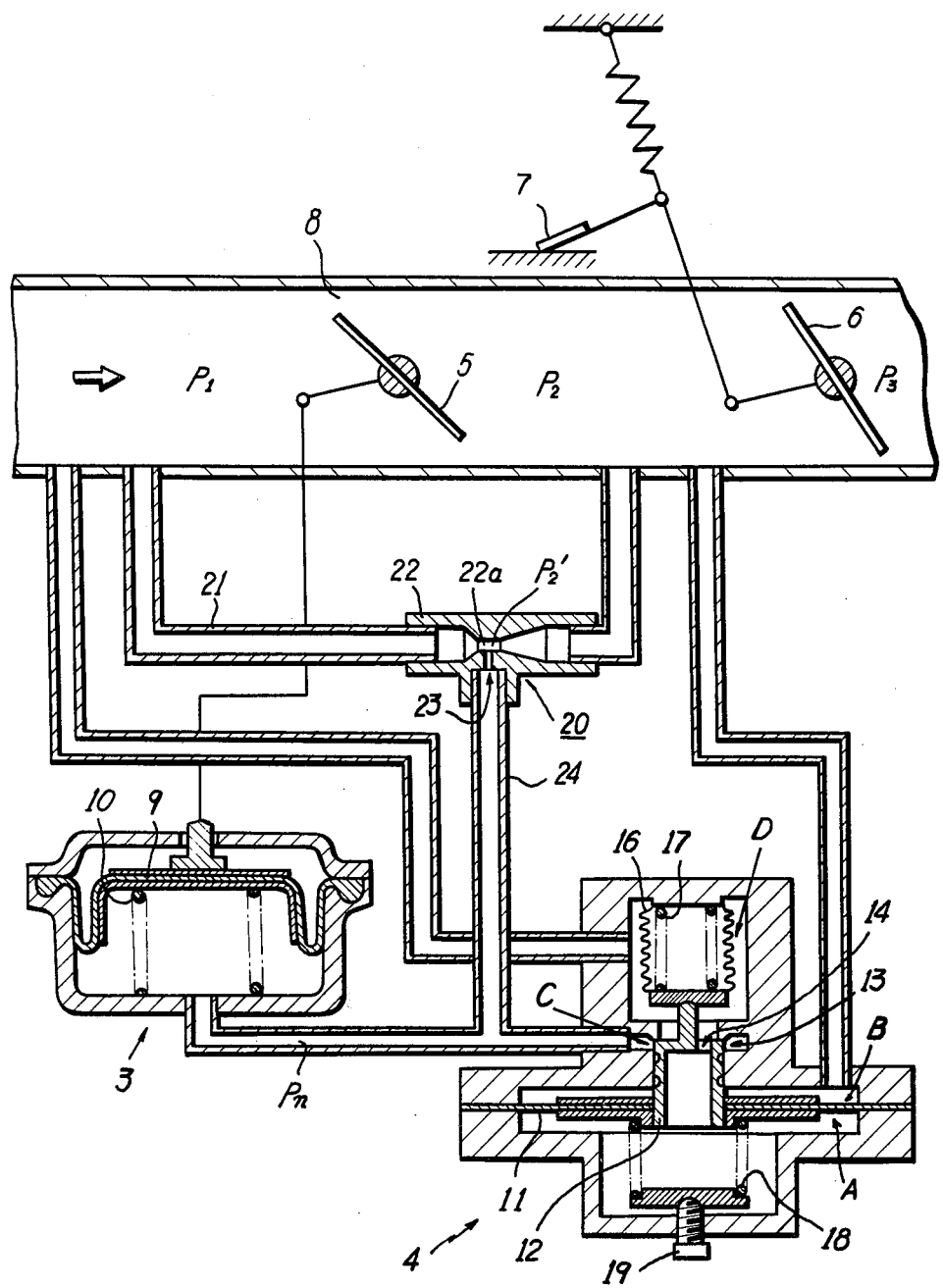
FIG. 2 is a longitudinal section of a first embodiment of the present invention.
Figure 3:
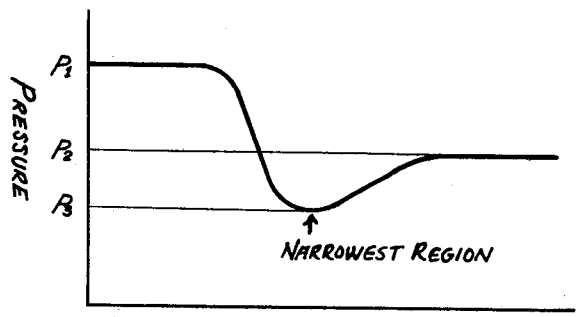
FIG. 3 is a graph showing the pressure in a Venturi tube.

FIG. 2 shows a first embodiment of the present invention. In FIG. 2, the numeral 20 designates a pressure amplifying mechanism comprising a venturi tube 22 disposed in a bypass pipeline 21 joining the upstream side of a flow rate detecting valve 5 to an intermediate chamber 8, and an orifice 23 disposed in the narrowest region 22a of the venturi tube 22. The orifice 23 communicates with the control chamber C of a valve opening mechanism 4 through a pipeline 24. In addition, the pressure to be detected in the narrowest region 22a of the venturi tube 22 is P2' which is lower than the pressure P2 in the intermediate chamber 8, as shown in FIG. 3. In such arrangement, the pressure to be detected by the diaphragm 11 of a servo-mechanism 4 is the pressure difference (P1-P2) across the flow rate detecting valve 5, and the area of opening of a variable orifice 13 varies with the pressure difference (P1-P2). The chamber C communicates with the pressure P1 on the upstream side of the flow rate detecting valve 5 and also with the pressure P2' in the narrowest region 22a of the venturi tube, so that the pressure Pn in the chamber C varies between P1 and P2'. After all, as compared with the pressure between P1 and P2' existing in the chamber C of the conventional arrangement, the pressure difference is increased by an amount of P2-P2', so that even if the pressure difference (P1-P2) across the flow rate detecting valve 5 is relatively small, the operation of the valve opening mechanim 3 is reliable. In addition, in this embodiment the downstream side of the bypass pipeline 21 communicates with the intermediate chamber 8, but it may communicate with the downstream side of the flow rate control valve 6, in which case the pressure in the chamber C varies between the P1 existing in the most upstream side and the pressure P3' which is lower than the pressure P3 existing in the most downstream side, so that the pressure difference is increased by an amount of P2'-P3' as compared with the case where it communicates with the intermediate chamber 8.

Figure 4:
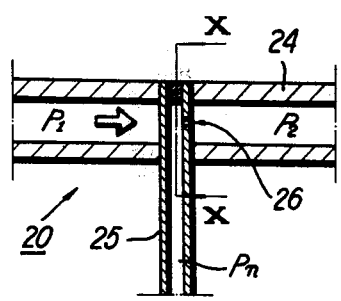
FIG. 4 is a longitudinal section of a pressure amplifying mechanism, showing a second embodiment of the invention.
Figure 5:
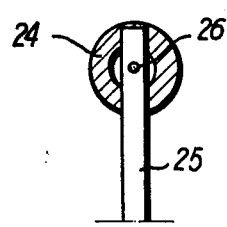
FIG. 5 is a section taken along the line X—X of FIG. 4.
Figure 6:
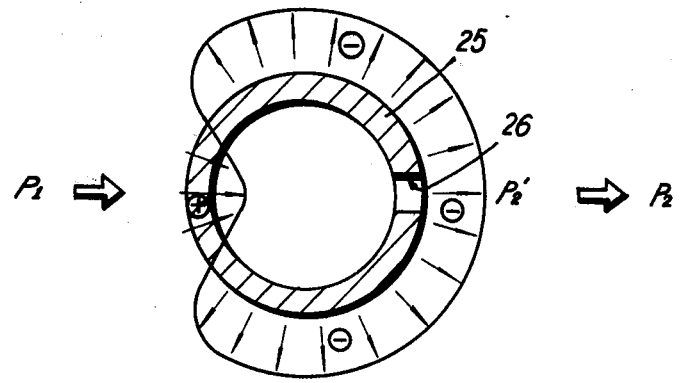
FIG. 6 is a pressure distribution graph, showing the principle of said second embodiment.

FIGS. 4 and 5 show a pressure difference amplifying mechanism 20 according to a second embodiment of the invention. The pressure difference amplifying mechanism 20 comprises a pipe 24 which forms part of a bypass pipeline 21, a pipe 25 whose outer diameter is smaller than the inner diameter of the pipe 24 and which extends through said pipe 24 at right angles therewith, and an orifice 26 formed in the downstream area of the cylindrical surface of said pipe 25 exposed to the interior of said pipe 24. When a fluid is flowing in the pipe 24, the pressure distribution around the pipe 25 is as shown in FIG. 6, indicating that the pressure P2' in the downstream side where the orifice 26 exists is lower than P2. According to an experiment, (P1-P2') was about 1.5 times (P1-P2). If, therefore, the pipe 25 is arranged to communicate with the valve opening mechanism 3 and the chamber C of the servo-mechanism, it is possible to achieve the same effect as in the first embodiment shown in FIG. 2.

Figure 7:
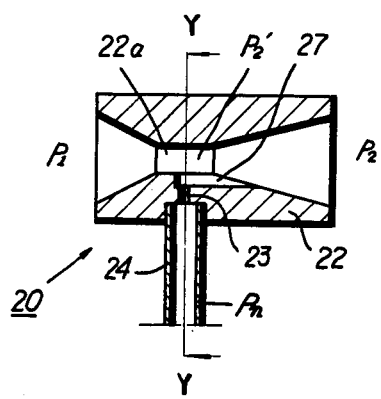
FIG. 7 is a longitudinal section of a pressure amplifying mechanism, showing a third embodiment of the invention.
Figure 8:
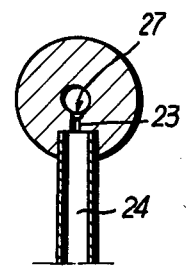
FIG. 8 is a section taken along the line Y—Y of FIG. 7.

FIGS. 7 and 8 show a pressure difference amplifying venturi tube in a form having a notch 27 added to the narrowest region 22a of the venturi tube 22 shown in FIG. 2. The notch 27 opens up toward the downstream side of the venturi tube 22 and an orifice 23 is provided in said notch 27. With this arrangement, the operation of the opening mechanism 3 becomes, of course, reliable, and the resistance to the flow of the fluid entering the narrowest region 22a from the pipeline 23 is decreased, so that the response of the servo-mechanism is improved.

Figure 9:
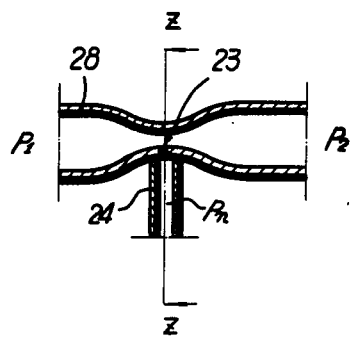
FIG. 9 is a longitudinal section of a pressure amplifying mechanism, showing a fourth embodiment of the invention.
Figure 10:
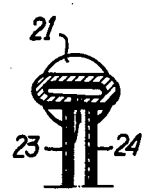
FIG. 10 is a section taken along the line Z—Z of FIG. 9.

FIGS. 9 and 10 illustrate a method of inexpensively producing a mechanism which has the same function as the venturi tube 22. As shown in FIG. 10, a portion of a pipe 28 is flattened and an orifice 23 is provided at the flattened portion.

Figure 11:
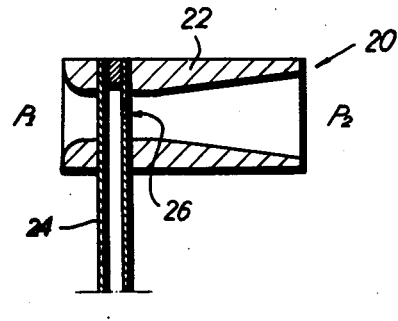
FIG. 11 is a longitudinal section of a pressure amplifying mechanism, showing a fifth embodiment of the invention.

FIGS. 11 and 12 show pressure difference amplifying mechanisms 20 according to other embodiments of the invention. The embodiment shown in FIG. 11 is a combination of the principles of the venturi tubes 22 shown in FIGS. 2, 7 and 8, and the principle of the mechanism shown in FIGS. 4 and 5, while the embodiment shown is FIG. 12 is a combination of two venturi tubes 22 and the mechanism shown in FIGS. 4 and 5. Both are intended to increase the magnification of the pressure difference.

While specific embodiments of the invention have been described in detail with reference to the accompanying drawings, it is to be understood that the invention is not limited thereto and that various changes and modifications may be made by those skilled in the art without departing from the spirit and scope of the invention.

What is claimed is:

1. A device for measuring the flow rate of air drawn into an internal combustion engine, said device comprising:
   (a) an air intake conduit through which air is drawn into the engine;
   (b) throttle valve means positioned in the conduit for controlling the flow rate of air therethrough;
   (c) a sensor valve means positioned in the conduit upstream of the throttle valve means whereby the opening of the throttle valve means produces a difference in pressure across the sensor valve means;
   (d) servo means operable to adjust the sensor valve means such that the pressure differential across the throttle valve means and the sensor valve means remains constant such that the measure of the flow rate of air past the sensor valve means is measured in terms of the area of the opening of the sensor valve means, the servo means including:
      a control valve disposed between first and second control chambers in said servo means,
      a first passage means extending from the conduit upstream of the sensor valve means to the first control chamber and a second passage means extending from said second control chamber to a sensor valve control means,
      a variable flow orifice means between said first and second control chambers wherein the variable flow orifice means varies its opening area in response to any variation of the control valve, thereby varying the pressure in the second control chamber,
      said sensor valve control means being responsive to the pressure in said second control chamber and including means coupled to the sensor valve means for varying the sensor valve means as a function of the air pressure in the second control chamber; and a third passage means extending from between said sensor valve means and said throttle valve means and extending to said servo means, said control valve including means responsive to pressure in said third passage means to vary its opening
   (e) a pressure amplifying means including:
      a bypass passage means connected between the upstream and downstream portions of the conduit across the sensor valve means,
      pressure decreasing means connected in the bypass pipeline for decreasing the pressure of air flowing therethrough, and a fourth passage means from said bypass passage means to said second control chamber and in communication with the decreased pressure from said pressure decreasing means whereby the pressure difference across the sensor valve means is amplified in the second control chamber by the pressure amplifying means such that the air pressure in the control chamber has a magnitude of variation sufficient to ensure reliable operation of the sensor valve means.

2. A device as set forth in claim 1, wherein the pressure decreasing means comprises a venturi tube.

3. A device as set forth in claim 2, wherein the narrowest region of the venturi tube is formed with a notch which opens up toward the downstream side of the venturi tube.

4. A device as set forth in claim 1, wherein the pressure decreasing means comprises a pipe having an end extending through a portion of the bypass passage means the other end thereof communicating with the second control chamber.

5. A device as set forth in claim 1, wherein the pressure decreasing means comprises a flattened portion of the bypass passage means, the flattened portion being connected to the second control chamber through the pressure decreasing means, the pressure decreasing means being formed in the flattened portion.

6. A device as set forth in claim 1, wherein the pressure decreasing means comprises a venturi tube connected in the bypass pipeline, and a pipe having one end at a right angle with the narrowest region of the venturi tube and having the other end connected to the second control chamber, an opening being formed in a portion of the pipe and directed to the downstream side of the venturi tube.

* * * * *